(12) United States Patent
Stout

(10) Patent No.: US 12,059,103 B2
(45) Date of Patent: Aug. 13, 2024

(54) BATH AND SHOWER FLOOR WITH ANTI-SLIP SURFACE AND METHOD OF FORMING SAME

(71) Applicant: Kohler Co., Kohler, WI (US)

(72) Inventor: Kenneth L. Stout, Sheboygan Falls, WI (US)

(73) Assignee: KOHLER CO., Kohler, WI (US)

( * ) Notice: Subject to any disclaimer, the term of this patent is extended or adjusted under 35 U.S.C. 154(b) by 808 days.

(21) Appl. No.: 17/063,393

(22) Filed: Oct. 5, 2020

(65) Prior Publication Data

US 2021/0100405 A1 Apr. 8, 2021

Related U.S. Application Data

(60) Provisional application No. 62/912,242, filed on Oct. 8, 2019.

(51) Int. Cl.
*A47K 3/40* (2006.01)
*B23K 26/364* (2014.01)

(52) U.S. Cl.
CPC .............. *A47K 3/40* (2013.01); *B23K 26/364* (2015.10)

(58) Field of Classification Search
CPC ....................................................... A47K 3/40
See application file for complete search history.

(56) References Cited

U.S. PATENT DOCUMENTS 2,809,380 A 10/1957 Gruen
3,942,199 A * 3/1976 Kollsman .............. A47K 3/002
482/30
5,885,339 A 3/1999 Dorsett
6,434,897 B1 8/2002 Sievers et al.
6,673,417 B1 1/2004 Gudet
9,340,983 B2 5/2016 Gmitro et al.
10,040,268 B2 8/2018 Sasaki et al.
10,286,632 B2 5/2019 Eckelt
2004/0148892 A1 8/2004 Kitakado
(Continued)

FOREIGN PATENT DOCUMENTS

CN 1160626 A 10/1997
CN 101289282 A 10/2008
(Continued)

OTHER PUBLICATIONS

Second Chinese Office Action on CN Appl. Ser. No. 202011073195.4 dated May 30, 2022 (14 pages).
(Continued)

*Primary Examiner* — Lauren A Crane
(74) *Attorney, Agent, or Firm* — FOLEY & LARDNER LLP

(57) ABSTRACT

A shower receptor includes a base having a floor surface configured for a user to stand on. The floor surface includes a first portion having a first coefficient of friction and a second portion having a second coefficient of friction. The first portion is an etched area of the floor surface that defines a surface texture having a depth. The second portion is an unetched area of the floor surface. The first coefficient of friction of the first portion has a first value when the first portion is wet and the second coefficient of friction of the second portion has a second value when the second portion is wet. The first value is higher than the second value.

13 Claims, 3 Drawing Sheets

(56) References Cited

U.S. PATENT DOCUMENTS

| | | | |
|---|---|---|---|
| 2005/0081290 A1* | 4/2005 | Stimpson | A47K 3/40 4/613 |
| 2005/0129913 A1 | 6/2005 | Kobayashi et al. | |
| 2012/0225249 A1 | 9/2012 | Neu et al. | |
| 2019/0208965 A1 | 7/2019 | Gerhard et al. | |

FOREIGN PATENT DOCUMENTS

| | | |
|---|---|---|
| CN | 102926520 A | 2/2013 |
| JP | H1014803 A | 1/1998 |
| JP | 2006-321257 A | 11/2006 |
| WO | WO-96/36469 A1 | 11/1996 |
| WO | WO-98/17600 A2 | 4/1998 |

OTHER PUBLICATIONS

First Chinese Office Action on CN Appl. Ser. No. 202011073195.4 dated Nov. 25, 2021 (15 pages).
First Indian Examination Report on IN Appl. Ser. No. 202014043687 dated Dec. 24, 2021 (5 pages).

\* cited by examiner

BATH AND SHOWER FLOOR WITH ANTI-SLIP SURFACE AND METHOD OF FORMING SAME

CROSS-REFERENCE TO RELATED APPLICATIONS

This application claims the benefit of and priority to U.S. Provisional Application No. 62/912,242, filed on Oct. 8, 2019, the entire disclosure of which is hereby incorporated by reference herein.

BACKGROUND

The present application relates generally to bath and shower floor surfaces. More specifically, the present application relates to bath and shower floors that include an anti-slip surface.

SUMMARY

At least one embodiment relates to a shower receptor including a base having a floor surface configured for a user to stand on. The floor surface includes a first portion having a first coefficient of friction and a second portion having a second coefficient of friction. The first portion is an etched area of the floor surface that defines a surface texture having a depth. The second portion is an unetched area of the floor surface. The first coefficient of friction of the first portion has a first value when the first portion is wet and the second coefficient of friction of the second portion has a second value when the second portion is wet. The first value is higher than the second value.

Another embodiment relates to a method of forming a shower receptor. The method includes forming a base having a floor surface configured for a user to stand on, and selectively etching, by a laser, directly into the floor surface to form a first portion having a surface texture with a depth and a first coefficient of friction. The floor surface includes a second portion that is unetched and has a second coefficient of friction. The first coefficient of friction has a first value when the first portion is wet and the second coefficient of friction has a second value when the second portion is wet. The first value is higher than the second value.

Another embodiment relates to a bathing structure including a floor surface configured for a user to stand on. The floor surface includes a first portion having a first coefficient of friction and a second portion having a second coefficient of friction. The first portion is an etched area of the floor surface that defines a surface texture having a depth. The second portion is an unetched area of the floor surface. The first coefficient of friction has a first value when the first portion is wet and the second coefficient of friction has a second value when the second portion is wet. The first value is higher than the second value.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
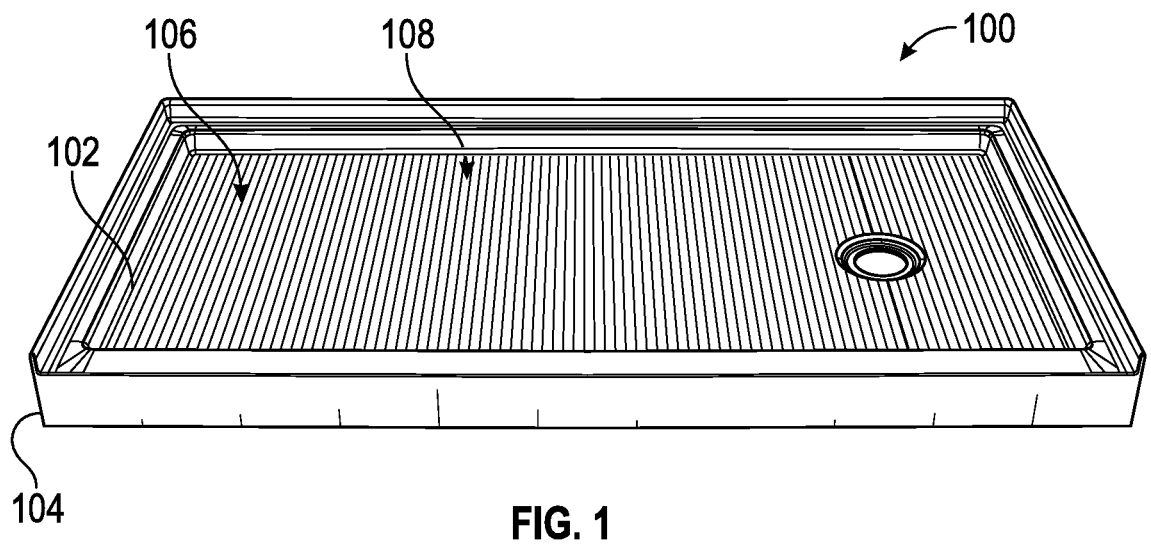
FIGS. 1 and 2 are perspective views of a shower receptor, in accordance with an exemplary embodiment of the present application.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The following description focuses primarily on anti-slip surfaces formed on polymeric bathing structures, such as shower receptors and bathtubs, but it should be appreciated that the disclosed anti-slip floor surfaces can be formed on other polymeric or non-polymeric floor surfaces in a bathing/shower environment or any other wet environment where it may be desirable to provide anti-slip protection (e.g., pools, spas, waterparks, etc.). Shower receptors and bathtub floors generally can be formed from a polymeric material, such as acrylic, which generally has a low wet coefficient of friction (CoF) (e.g., less than 0.42 per ANSI 137.1 standards), thus increasing the chance of a user slipping on the receptor/floor and falling when the surface is wet. Current solutions include applying a coating containing sand to increase the friction in wet conditions or using textured decals that adhere to the gloss floor surface. However, both of these solutions are unattractive to typical users, can be difficult to clean, and can peel off or deteriorate after continued use. This creates an unsanitary, short term, and undesirable situation. Thus, it would be advantageous to provide an improved floor surface for shower receptors and bathing floors that overcomes the foregoing challenges. These and other advantageous features will become apparent to those reviewing the present disclosure.

Generally speaking, etching techniques, such as laser etching, chemical etching, and sand blasting, have been used to form textured surfaces or areas that can provide anti-slip protection. However, these conventional etching techniques have not been applied in the context of polymeric surfaces used in shower or bathing environments (e.g., shower receptors, bathtub floors, etc.), due to, for example, difficulty controlling the surface quality, so as to maintain cleanliness, and the relatively large sizes of the surfaces to be etched. For example, controlling surface quality (e.g. etching depth, roughness, surface area, etc.) is crucial in overcoming the challenges relating to cleanliness. The peaks and valleys of an etched polymeric surface at a microscopic level must be monitored to increase the cleanability of the surface. Additionally, the size of a typical shower receptor presents a challenge because most lasers do not have the ability to etch an area of that size, which can be, for example, 3"×5".

The present disclosure relates to polymeric bath and shower floor surfaces that incorporate a combination of etched (e.g., first portion of a surface) and unetched portions (e.g., second portion of a surface) to benefit from the opposite nature of the respective CoF in wet and dry conditions. For example, unetched gloss acrylic has a very high CoF in dry conditions, but lower CoF when wet.

Applicant determined that selectively etching the substantially smooth gloss acrylic surface to form a first portion of the surface that defines a surface texture having a depth would increase the wet CoF of the surface, while still maintaining a high CoF when dry. Thus, it would be advantageous to combine the opposite nature of etched and unetched acrylic and their correlation to CoF under wet and dry conditions. Some benefits of such a configuration include, for example, (1) a reduced risk of a user slipping, (2) a more aesthetically pleasing appearance than the alternative solutions, and (3) a variety of available designs. The fabrication methods described herein to produce such a floor surface may include using a laser, sand blaster, sander, or chemicals. According to an exemplary embodiment, the etching is performed directly into the acrylic surface of the fully formed shower receptor or bathtub floor, as opposed to adding an additional layer before surface treating. According to other exemplary embodiments, the floor surface may also be formed of other polymeric materials or combinations of polymeric and non-polymeric materials.

Referring generally to the figures, disclosed herein is an anti-slip bath or shower floor surface that is selectively etched using laser etching to create a first portion that has a surface texture having a depth and a second portion that is unetched and has a substantially smooth, gloss surface finish. According to an exemplary embodiment, the bath and shower floor includes an etched design or pattern that covers the surface area of the floor/receptor surface by about 50% to create an acceptable CoF in both wet and dry conditions. Applicant determined that about 50% of etched coverage creates efficiency in both manufacturing and cost. According to another exemplary embodiment, the effective range of etched coverage may be about 30% to about 80% of the surface area of the floor surface, for instance. The percentage of etched coverage of the bath and/or shower floor may depend on pattern preference, available manufacturing time, and budget.

According to an exemplary embodiment, the method of etching the first portion into the floor surface of the shower receptor includes using a laser. By using a laser, an infinite number of designs or patterns of the matte portion can be created that would still meet the about 50% surface area coverage required for both wet and dry CoF. The laser can be used to create markings on the receptor, such as darker lines or patterns solely for aesthetic reasons. The method may further include using a sand blaster, sander, or chemicals to selectively etch the surface to create the first portion. For instance, cast solid surfaces can be textured in a mold.

Figure 2:
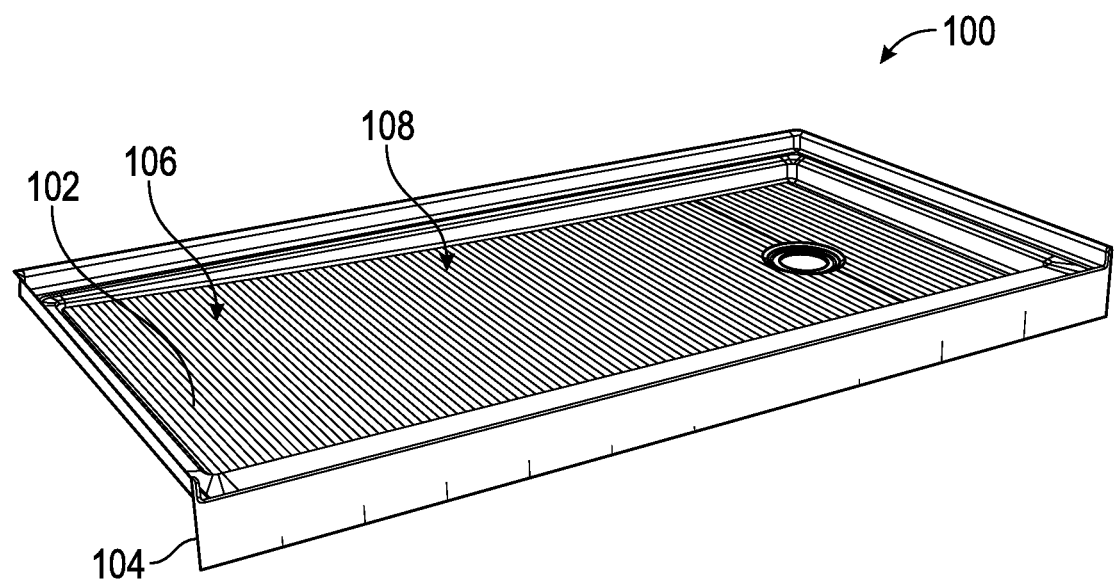

Referring to FIGS. 1-2, a bathing structure including a floor surface is shown as a shower receptor 100 according to an exemplary embodiment. The shower receptor 100 includes a base 102 and a perimeter wall 104, wherein the base 102 is generally rectangular and the perimeter wall 104 extends along each side of the base 102. In various embodiments, the base may be circular, triangular, or any shape suitable for a bath or shower floor. In various embodiments, the perimeter wall may extend along one or more sides of the base 102. The base 102 defines a floor surface configured for a user to stand on in, for example, a shower environment. The floor surface is generally planar and extends between the perimeter wall 104. The floor surface may be slightly angled toward a center, or off-center, location of a drain disposed in the base 102. The floor surface is configured for a user to stand on, such that the floor surface may bear the user's weight and provide an anti-slip surface. The floor surface, or shower receptor 100, includes a first portion 108 (e.g., matte portion, etched portion, etc.) and a second portion 106 (e.g., substantially smooth gloss acrylic portion, unetched portion, etc.). The second portion 106 and the first portion 108 may each cover about 50% of the floor surface area of the floor surface of shower receptor 100. However, the effective range of etched coverage may be about 30% to about 80% (e.g., about 40%, about 55%, about 75%, etc.), according to other exemplary embodiments. In some exemplary embodiments, the first portion 108 may be etched directly into the molded shower receptor 100 to a depth of about 50 microns. Wear studies have determined an effective anti-slip surface may be created with an etched depth of about 50 microns for a shower receptor and about 60 microns for a bath tub floor surface. Applicant determined that this depth can, advantageously, provide adequate anti-slip protection while maintaining cleanliness and aesthetic surface quality of the floor surface. According to other exemplary embodiments, the depth may be in a range of about 40 microns to about 70 microns (e.g., about 45 microns, about 60 microns, about 65 microns, etc.) for either a bath or a shower floor surface.

Figure 3:
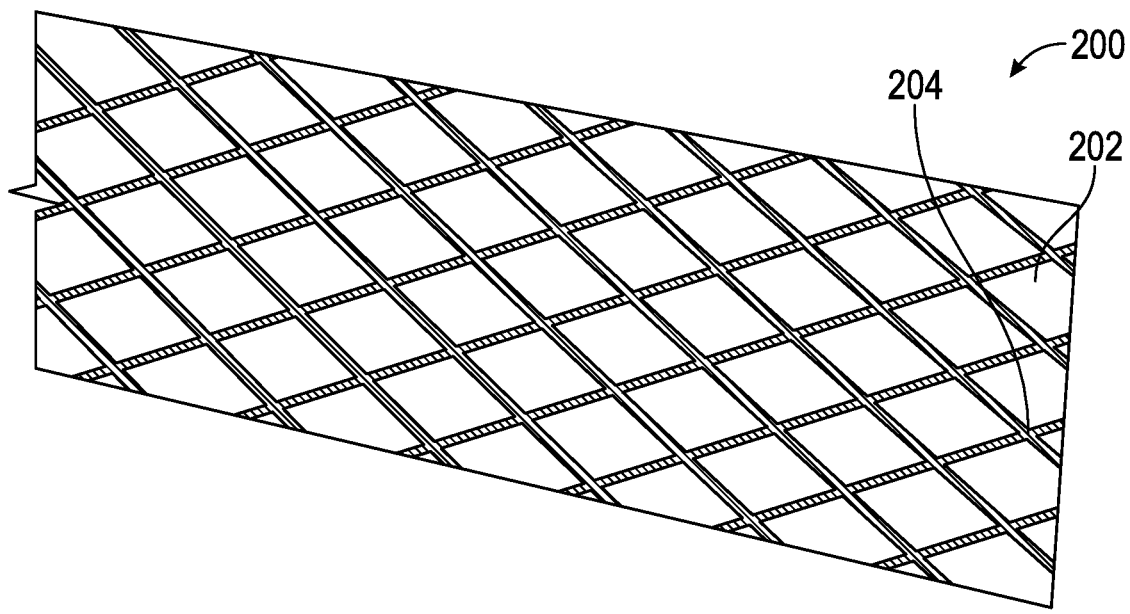
FIG. 3 is a top view of a laser etched floor surface, in accordance with another exemplary embodiment of the present application.
Figure 4:
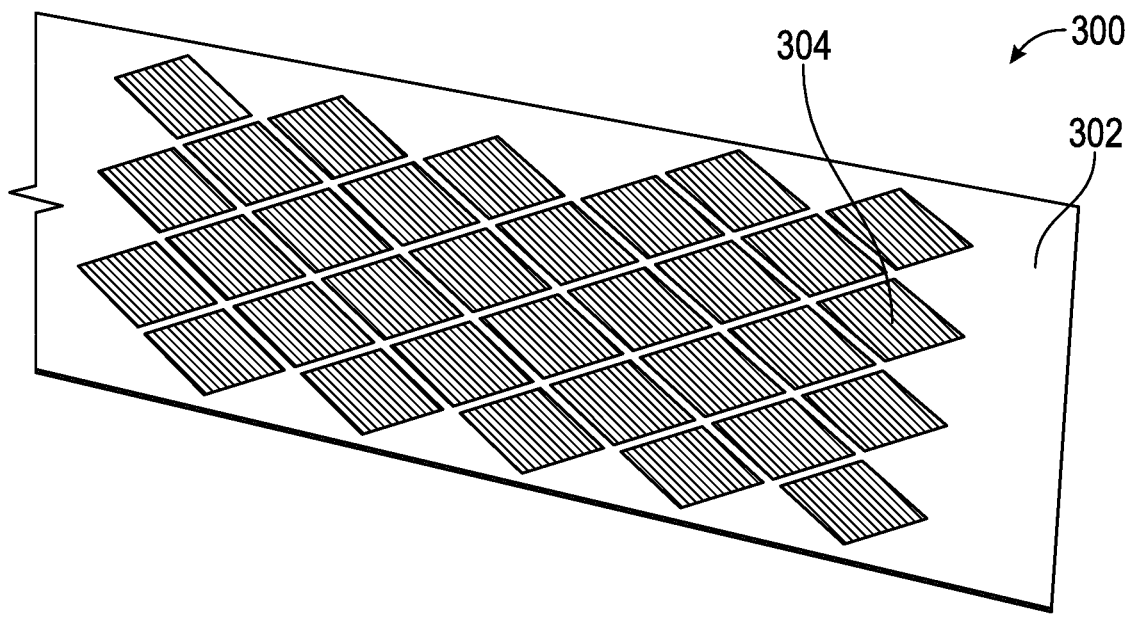
FIG. 4 is a top view of a laser etched floor surface, in accordance with another exemplary embodiment of the present application.

Referring to FIGS. 3-4, a floor surface 200, 300 for a shower receptor is shown according to another exemplary embodiment. Floor surface 200 includes first portion 204 and second portion 202. First portion 204 is selectively laser etched directly into the floor surface 200 of the molded shower receptor (e.g., the base 104). Similarly, floor surface 300 includes second portion 302 and first portion 304. First portion 304 is selectively laser etched directly into the floor surface 300 of the molded shower receptor. The shower receptor, including the floor surface 200, 300, may be made from acrylic, or any other compatible polymeric material or combinations of materials.

As shown in FIGS. 3-4, patterns were created to incorporate both etched (e.g., matte) and non-etched (e.g., gloss) portions in order to find an equilibrium between dry CoF and wet CoF. A variety of suitable patterns may be used, as long as the etched portions 204, 304 cover about 50% (e.g., about 40 to about 60%) of the surface area of the floor surface. In order to determine the equilibrium between dry CoF and wet CoF, Applicant tested various alternatives per ANSI 137.1 using a BOT3000e for wet DCoF and for dry SCoF. Acceptance per ANSI 137.1 and per ASTM C1028 is a wet DCoF>0.42 and a dry SCoF>0.60, respectively. Standard products, such as grit blast cast iron, gloss gelcoat, textured acrylic, etc., were tested for reference. Sample surfaces were 3"×12" with a thickness ranging from ⅛"-½" to fit into a test fixture. Applicant determined that surface area coverage of about 50% for both etched and non-etched (e.g., gloss) portions achieved a preferable equilibrium of wet and dry CoF for anti-slip protection in a shower or bathing environment.

As shown in FIGS. 1-2, the pattern may include a series of straight lines extending from a side of the perimeter wall 104 to an opposite side of the perimeter wall 104. The lines may extend across the width of the base 102 or the length of the base 102. The lines may be parallel to each other. The lines may be spaced apart equally. In various embodiments, the lines may be spaced apart with different distances between each other. For instance, the lines of the first portion 108 (e.g., the etched portion) may become denser closer to the perimeter wall 104 (i.e., further away from the drain), or vice versa. Further, the density of the lines may alternate across the base 102 (e.g., the density may be clustered and have several less-dense areas unrelated to the positioning of the drain). As shown in FIGS. 3-4, the pattern may be a cross-hatch configuration. The first portion 204 may form the cross-hatch configuration or the second portion 302 may form the cross-hatch configuration, as described herein. The orientation of the cross-hatch may be 45° to the laser probe path (e.g., 45° to the perimeter wall 104). Similar to the straight line pattern, the cross-hatching may be spaced apart equally or have varying densities. Further, there may be a smaller cross-hatching pattern within a larger cross-hatching pattern. Each of the patterns may be equally spaced or have varying densities. According to other exemplary embodiments, suitable patterns may include concentric shapes (e.g., circles, squares, triangles, etc.). The distance between each of the concentric shapes may be equally spaced or the spacing between each shape may vary. For instance, there may be a series of concentric circles that each have a circumference and expand outwardly from a center of the base 102 to the perimeter wall 104. In other embodiments, the distance of concentric circles to each other may increase and decrease in a telescoping-like manner. In addition to the embodiments described herein, a variety of patterns and combinations of patterns can be used.

Figure 5:
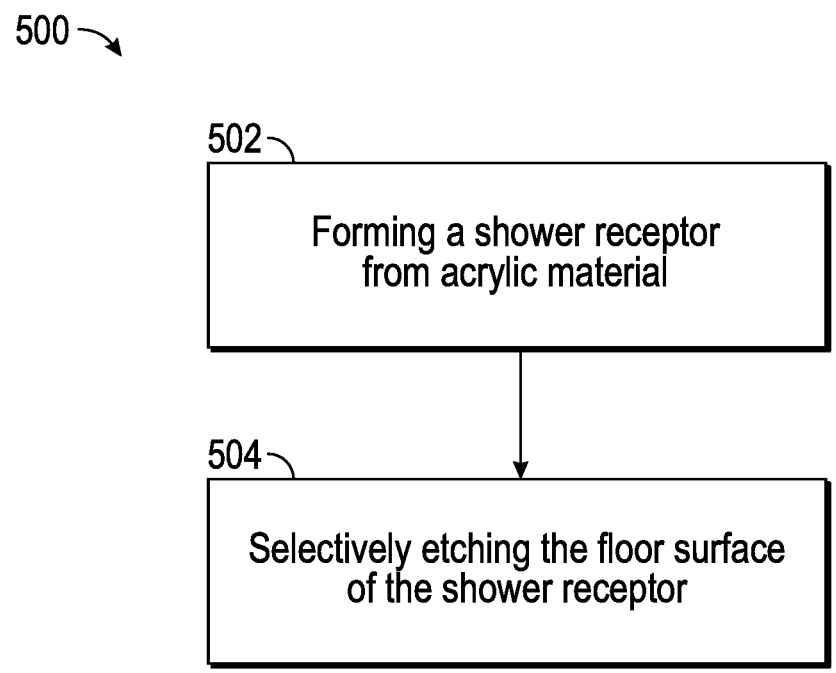
FIG. 5 is a flow chart illustrating a method for forming an anti-slip surface on a shower receptor, in accordance with another exemplary embodiment of the present application.

Referring to FIG. 5, a method of forming an anti-slip surface on a shower receptor 500 is shown according to an exemplary embodiment. The method includes forming a shower receptor from a polymeric material (e.g., acrylic, etc.) to define a base having a floor surface configured for a user to stand on (502). As described herein, it should be appreciated that the anti-slip floor surface can be formed on other polymeric or non-polymeric floor surfaces of other types of bathing structures in a bathing or shower environment (e.g., bath tubs, etc.). The method further includes selectively etching directly into the floor surface (504). According to an exemplary embodiment, selectively etching the floor surface includes using a laser to form an etched portion having a textured surface with a depth. A continuous wave laser (e.g., constantly etching) may be used. Alternatively, a pulsed laser can be used. The pulsed laser with a high frequency may replicate a continuous waver laser while achieving better slip resistant results. A variety of dots per square inch (DPI) may be used to achieve the desirable dry CoF. For instance, the DPI may range from about 54 to about 1600 (e.g., 453, 533, etc.). Selectively etching the floor surface may also include using a sand blaster, sander, or chemicals, according to other exemplary embodiments. Selectively etching the floor surface may include etching to form a first portion that defines a textured surface having a depth of about 50 microns in the floor surface. Selectively etching the floor surface 504 may include etching about 50% of the floor surface area. However, as described herein, the depth may be in a range of about 40 microns to about 70 microns (e.g., about 45 microns, about 60 microns, about 65 microns, etc.) for either a bath or shower floor, and the effective range of the etched coverage may be about 30% to about 80% (e.g., about 40%, about 55%, about 75%, etc.)

The present disclosure describes a bath or shower floor surface that can, advantageously, combine the high CoF of gloss surfaces (i.e., unetched surfaces) and high CoF of matte surfaces (i.e., etched surfaces) in both dry and wet conditions, respectively. Other uses of the disclosed floor surface may be as any anti-slip floor which comes in contact with water, for instance a bathroom (other than a shower receptor or bathtub), a pool deck, a locker room, a commercial kitchen, a manufacturing plant, a laboratory, etc. Benefits of the anti-slip surface and methods described herein include, for example, a reduced risk of the user slipping, a more aesthetically pleasing appearance than the alternative solutions, and a variety of available designs.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A shower receptor comprising:
   a base having a floor surface configured for a user to stand on, wherein the floor surface includes a first portion having a first coefficient of friction and a second portion having a second coefficient of friction;
   wherein the first portion is an etched area of the floor surface that defines a surface texture having a depth that is below the second portion;
   wherein the second portion is an unetched area of the floor surface;
   wherein the first coefficient of friction of the first portion has a first value when the first portion is wet, the second coefficient of friction of the second portion has a second value when the second portion is wet, and wherein the first value is higher than the second value.

2. The shower receptor of claim 1, wherein the first portion covers about 30% to about 80% of the surface area of the floor surface.

3. The shower receptor of claim 1, wherein the first portion covers about 50% of the surface area of the floor surface.

4. The shower receptor of claim 1, wherein the depth is about 40 microns to about 70 microns.

5. The shower receptor of claim 1, wherein the depth is about 50 microns.

6. The shower receptor of claim 1, wherein the floor surface is formed from an acrylic material.

7. The shower receptor of claim 1, wherein the second portion defines a substantially smooth gloss surface.

8. A bathing structure comprising:
   a floor surface configured for a user to stand on, the floor surface comprising a first portion having a first coefficient of friction and a second portion having a second coefficient of friction;
   wherein the first portion is an etched area of the floor surface that defines a surface texture having a depth that is below the second portion;
   wherein the second portion is an unetched area of the floor surface;
   wherein the first coefficient of friction has a first value when the first portion is wet;
   wherein the second coefficient of friction has a second value when the second portion is wet; and
   wherein the first value is higher than the second value.

9. The bathing structure of claim 8, wherein the depth is about 40 microns to about 70 microns.

10. The bathing structure of claim 8, wherein the first portion covers about 30% to about 80% of the surface area of the floor surface.

11. The bathing structure of claim 8, wherein the bathing structure is one of a shower receptor or a bathtub.

12. The bathing structure of claim 8, wherein the floor surface is made from acrylic.

13. The bathing structure of claim 8, wherein the second portion defines a substantially smooth gloss surface.

* * * * *